United States Patent [19]
Saito

[11] Patent Number: 4,626,094
[45] Date of Patent: Dec. 2, 1986

[54] SHUTTER TIME SWITCHING DEVICE FOR ROTARY SHUTTER

[75] Inventor: Syuichiro Saito, Kanagawa, Japan

[73] Assignee: Canon Kabushiki Kaisha, Tokyo, Japan

[21] Appl. No.: 670,748

[22] Filed: Nov. 13, 1984

[30] Foreign Application Priority Data

Nov. 16, 1983 [JP] Japan ................................ 58-215740
Nov. 16, 1983 [JP] Japan ................................ 58-215741

[51] Int. Cl.$^4$ .......................... G03B 7/00; G03B 9/16; H04N 5/225
[52] U.S. Cl. .................................... 354/456; 358/225; 354/254
[58] Field of Search ................ 354/439, 435, 441–445, 354/452, 456, 250, 254; 352/91 R, 91 C, 91 S, 216, 217; 318/630; 358/225, 228

[56] References Cited

U.S. PATENT DOCUMENTS 3,143,046 8/1964 Pennock et al. .................... 354/456
3,355,642 11/1967 Leenhouts ............................ 318/630
4,057,810 11/1977 Iwata ................................. 354/439

Primary Examiner—William B. Perkey
Attorney, Agent, or Firm—Toren, McGeady, Stanger, Goldberg & Kiel

[57] ABSTRACT

The disclosed shutter time switching device for a rotary shutter is provided with a stepping motor for controlling the opening angle of the rotary shutter. The device includes a driving mechanism for driving the stepping motor in a two-phase driving mode when switching between relatively high shutter speeds and in a single-phase driving mode when switching between relatively low shutter speeds. Optimum responsivity of the switching operation is thus obtained. The stepping motor is rotatable in a first direction and a second direction which is reverse to the first direction. To solve the problem of hysteresis of the motor, the device is provided with a further drive mechanism for driving the stepping motor in the first direction at least one step before a desired step position, regardless of whether the motor has been driven in the first or second direction for switching the shutter speed.

24 Claims, 23 Drawing Figures

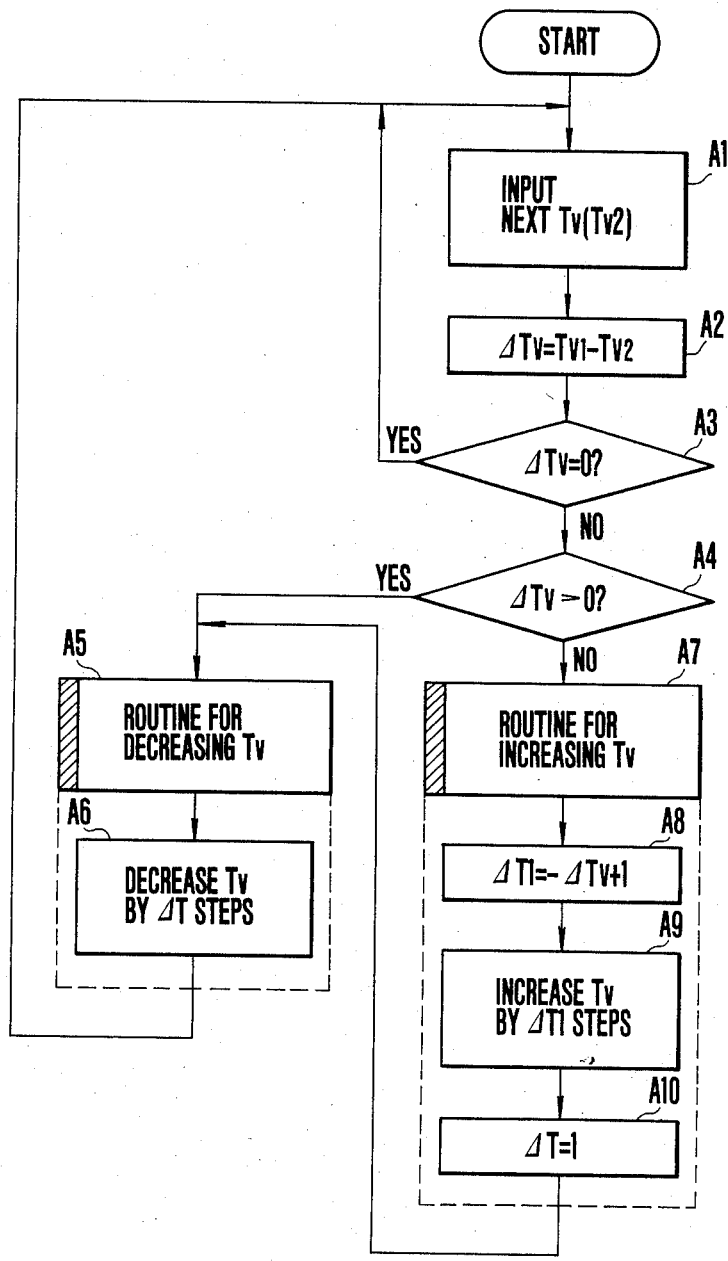

FIG.9(a)    FIG.9(d)
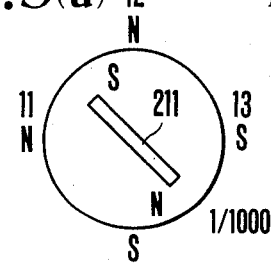  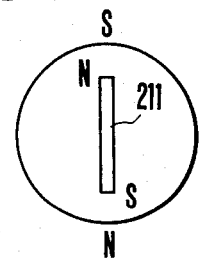
FIG.9(b)    FIG.9(e)
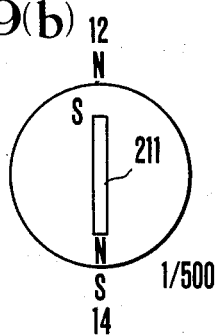  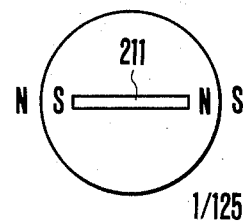
FIG.9(c)
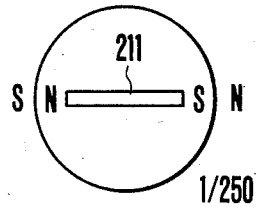
FIG.10
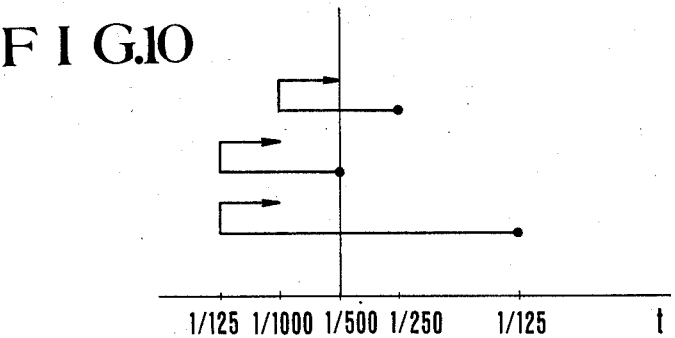

SHUTTER TIME SWITCHING DEVICE FOR ROTARY SHUTTER

BACKGROUND OF THE INVENTION

1. Field of the Invention

This invention relates to a shutter time switching device for switching the shutter time of a rotary shutter employed in an exposure control system of a camera and more particularly to preventing occurrence of an error in a rotary shutter time switching device which controls the opening angle of a rotary shutter by means of a stepping motor. The invention further relates to a rotary shutter time switching device which is quickly responsive.

2. Background of the Prior Art

Prior art exposure control systems using a rotary shutter control the shutter opening angle by manual operation of a shutter time setting dial and by adjusting the opening angle of the shutter through a cam, a lever, etc. This arrangement, however, makes it impossible to carry out an aperture-priority automatic exposure control or programmed automatic exposure control.

To permit programmed automatic exposure control, it is conceivable to have the opening angle of the rotary shutter controlled by a stepping motor. However, this requires overcoming a problem presented by hysteresis characteristic of the stepping motor. For example, in setting the shutter opening angle at 1/500 sec, the direction in which the stepping motor rotates for switching from 1/1000 sec to 1/500 sec is reverse to the direction in which the motor rotates for switching from 1/250 sec to 1/500 sec. Because of the hysteresis characteristic of the stepping motor, the stepping position of the motor varies somewhat depending on its rotating direction. Accordingly, this results in some error in the exposure time. Further, since the exposure time values are arranged in a multiple series, the shutter opening control in the programmed automatic exposure control method must also be performed in a multiple series. Where the shutter opening angle is controlled by a stepping motor through a gear arrangement or the like, and switching from a highest shutter speed time to a next highest shutter speed time is arranged to occur in one step, the response time for the shutter time switch-over becomes unduly long as the number of steps from one shutter time value to another increases in a multiple serial manner.

SUMMARY OF THE INVENTION

It is therefore an object of the present invention to provide a mechanism for preventing an error in exposure time from occuring due to the hysteresis characteristic of a stepping motor of a shutter time switching device which controls the opening angle of a rotary shutter with the stepping motor.

It is another object of the invention to provide a mechanism for shortening the response time of the shutter time switching operation of a shutter time switching device which controls the opening angle of a rotary shutter with a stepping motor.

In a shutter switching device embodying this invention as a first embodiment thereof and controlling the opening angle of a rotary shutter by means of a stepping motor rotatable in a first direction and a second direction which is reverse to the first direction, the stepping motor is arranged to be driven to rotate in the first direction at least one step before a desired step position irrespective of whether the stepping motor has been driven to rotate in the first direction or in the second direction for shutter time switching, so that any error in exposure time resulting from the hysteresis characteristic of the stepping motor can be either prevented or lessened.

A second embodiment of this invention is capable of enhancing the responsivity of an exposure control system in a camera by the following arrangement for controlling the opening angle of a rotary shutter by means of a stepping motor: The stepping motor is arranged to be driven in a two-phase driving mode for switching between two relatively high shutter speeds and in a single-phase driving mode for switching between two relatively low shutter speeds. Compared to carrying out switching solely in a singlephase driving mode, the response time of the shutter time switching operation can be shortened to a great extent.

The above and further objects and features of the invention will become apparent from the following detailed description of preferred embodiments thereof taken in connection with the accompanying drawings.

BRIEF DESCRIPTION OF THE DRAWINGS

FIGS. 5(a)–5(j) show the operation of the stepping motor with the motor driving circuit connected as shown in FIG. 4.

FIG. 6 is a flow chart showing the details of a shutter time setting operation of the first embodiment.

FIGS. 9(a)–9(e) show the operation of the stepping motor with circuit connection made as shown in FIG. 8.

FIG. 10 is a graph showing the operation of the motor of a third embodiment of the invention.

DETAILED DESCRIPTION OF THE PREFERRED EMBODIMENTS

The following description, in conjunction with the accompanying drawings, shows by way of example various arrangements for attaining the objects of this invention mentioned in the foregoing. The description will be given in the order of specific arrangement example of the shutter time switching device; stepping motor driving control arrangement; and shutter time switching control system arrangement.

Figure 1:
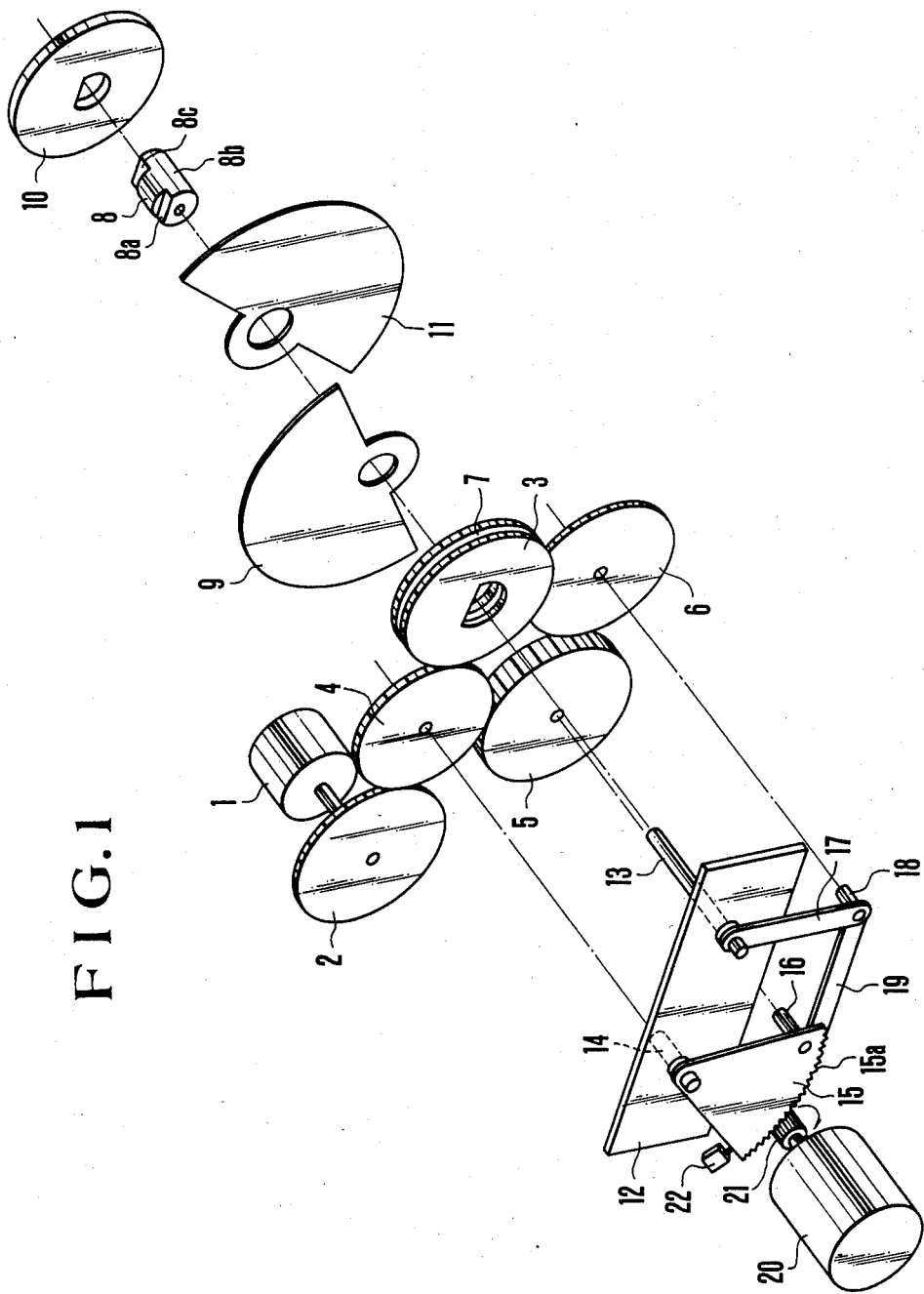
FIG. 1 is an oblique view showing a shutter time switching device arranged as an embodiment of the present invention.

FIG. 1 shows a specific arrangement of a shutter time switching device as an embodiment of this invention. The illustration includes a DC motor 1 which is arranged to drive a rotary shutter; a motor gear 2 which is secured to the rotation shaft of the DC motor 1; and gears 3–7. As shown, the motor gear 2 engages with the gear 4, the gear 4 with the gears 3 and 5, the gear 5 with the gear 6 and the gear 6 with the gear 7, respectively.

A shaft 8 has the gear 3 secured to one end 8a thereof while the gear 7 is rotatably attached to the cylindrical part 8b thereof. A first shutter blade 9 is secured to the gear 7. A rotating plate 10 is secured to the other end 8c of the shaft 8. A second shutter blade 11 is secured to the rotating plate 10. Further, the shaft 8 is rotatably attached to a rotation shaft 13 which will be described later herein. The shutter blades 9 and 11 are arranged to be turned by the DC motor 1 in the same direction. Their turning speed is arranged to be constant by the gear ratio of the above-stated gears. The illustration further includes a base plate 12; rotation shafts 13, 14, 16 and 18; a sector 15; an arm 17; and a link arm 19. The rotation shafts 13 and 14 are secured to the base plate 12. The arm 17 is rotatably attached to one end of the rotation shaft 13. The sector 15 is rotatably attached to one end of the rotation shaft 14. The rotation shaft 16 is secured to the sector 15 and the rotation shaft 18 to the arm 17, respectively. The gears 4, 5 and 6 are rotatably mounted on these rotation shafts 14, 16 and 18, respectively. The link arm 19 is rotatably connected to the rotation shafts 16 and 18. A parallel link is formed by the rotation shafts 13, 14, 16 and 18, the arm 17, the sector 15 and the link arm 19.

A stepping motor 20 is arranged to be driven both with a two-phase power and a single-phase power. A gear 21 engages the gear part 15a of the sector 15. A switch 22 is arranged to detect the start or initial position of the sector 15.

With the embodiment arranged in this manner, when power is supplied to the DC motor 1, the gear 3 is turns via the motor gear 2 and the gear 4 while the rotating plate 10 unified with the gear 3 via the shaft 8 and the shutter blade 11 also turn. On the other hand, the gear 7 turns via the motor gear 2 and the gears 4, 5 and 6. This causes the shutter blade 9 to turn. In this instance, as mentioned above, the shutter blades 9 and 11 turn in the same direction and at a constant speed. Then, when the stepping motor 20 rotates, the sector 15 turns via the gear 21 and the gear part 15a on the rotation shaft 14. As a result, the action of the abovestated parallel link mechanism 13-19 brings about changes in engagement phases between the gears 4 and 5 and between the gears 6 and 7. However, the engagement phase between the gears 4 and 3 remains unchanged. Accordingly, the relative phase between the shutter blades 9 and 11 changes according to the rotation step of the stepping motor 20. This brings about a change in the opening angle of the rotary shutter.

Figure 2:
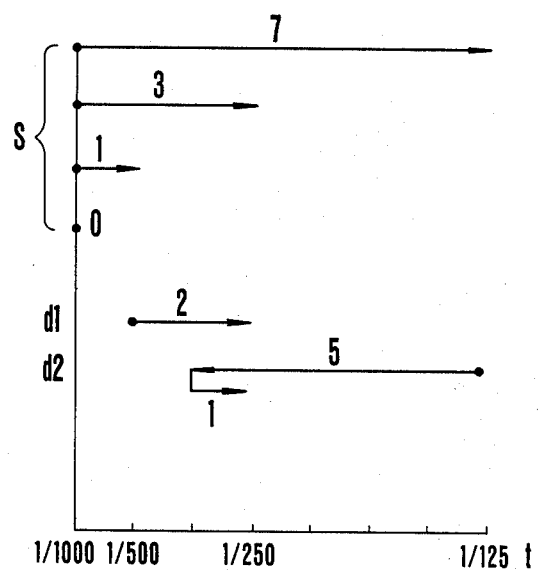
FIG. 2 is a graph showing by way of example a stepping motor driving control operation performed according to this invention.

FIG. 2 shows the stepping motor driving control of this embodiment. In FIG. 2, a reference symbol "s" denotes the number of rotation steps of the stepping motor while a symbol "t" denotes shutter time. In this instance, the shutter time is switched between 1/1000 sec and 1/125 sec. The sector 15 of FIG. 1 is assumed to be abutting on the switch 22 and the stepping motor in its initial position when the shutter time is set at 1/1000 sec. The shutter time becomes 1/500 sec when the stepping motor 20 turns clockwise by one step as viewed on the drawing. The shutter time becomes 1/250 sec when the stepping motor 20 turns further clockwise by 2 steps (a total of 3 steps) and then becomes 1/125 sec when the motor turns another 4 steps (a total of 7 steps). Further, in this instance, the rotating direction of the stepping motor 20 for switching the shutter time from a high shutter speed to a low shutter speed, as in the above-stated case, is arranged to be the above-stated first direction and a rotating direction reverse to this to be the second direction. In setting the shutter time at 1/250 sec, for example, the stepping motor 20 is to be driven from a high shutter speed position in the first direction (clockwise as viewed on FIG. 1) in one instance and to be driven from a low shutter speed position in the second direction (counterclockwise as viewed on FIG. 1) in another instance. In the former instance, if the shutter time is to be shifted from 1/500, the stepping motor 20 is driven to rotate by two steps. In the latter instance, if the shutter time is to be shifted from 1/125, the stepping motor 20 is driven to rotate by four steps in the reverse direction. However, the stopping position of the stepping motor 20 deviates somewhat from a correct position toward a 1/500 sec position in the former instance and toward a 1/125 sec position in the latter instance. In other words, the stepping motor has a hysteresis characteristic, which affects the accuracy of shutter time setting and results in some error in the exposure time thus obtained.

The present invention is directed to prevention of such an exposure time error due to the hysteresis characteristic of the stepping motor. Referring to FIG. 2, in shifting the shutter time from 1/500 sec to 1/250 sec, for example, the stepping motor is driven to rotate by two steps the first direction as mentioned above. However, when shifting it from 1/125 sec to 1/250 sec, the stepping motor is first driven to rotate by five steps in the second direction and then is driven to rotate back by one step in the first direction. In other words, in shifting the shutter time to a desired shutter time value, the stepping motor is controlled to be driven in the first direction from a point one step before the desired step position (from a high speed position to a low speed position in the above-stated instance) irrespective of the stepping motor driving direction for the desired shutter time.

When the shutter time is to be set at 1/1000 sec, which is the highest shutter speed, it is preferable to first drive the stepping motor to a step position beyond a step position corresponding to 1/1000 sec by one step and then to drive it back to the step position corresponding to 1/1000 sec. However, since the highest or maximum shutter speed is not likely to be used often, this case may be arranged to be an exception and to have the stepping motor driven solely in the second direction and stopped at the step position corresponding to 1/1000 without driving it beyond that position. Further, in the above-described instance, the stepping motor driving direction for shifting from a high shutter speed to a low speed is arranged to be the first direction and the driving direction for shifting from a low speed to a high speed to be the second direction. However, these directions may be arranged in a converse manner. In that case, however, it is preferable to have an additional or extra step position arranged at least one step away from the step position corresponding to 1/125 in the second direction.

In accordance with the control arrangement described above, the stepping motor is always arranged to be driven in one specific rotating direction at a point one step before the desired step position. This arrangement prevents or lessens the error in exposure time due to the hysteresis characteristic of the stepping motor.

Figure 3:
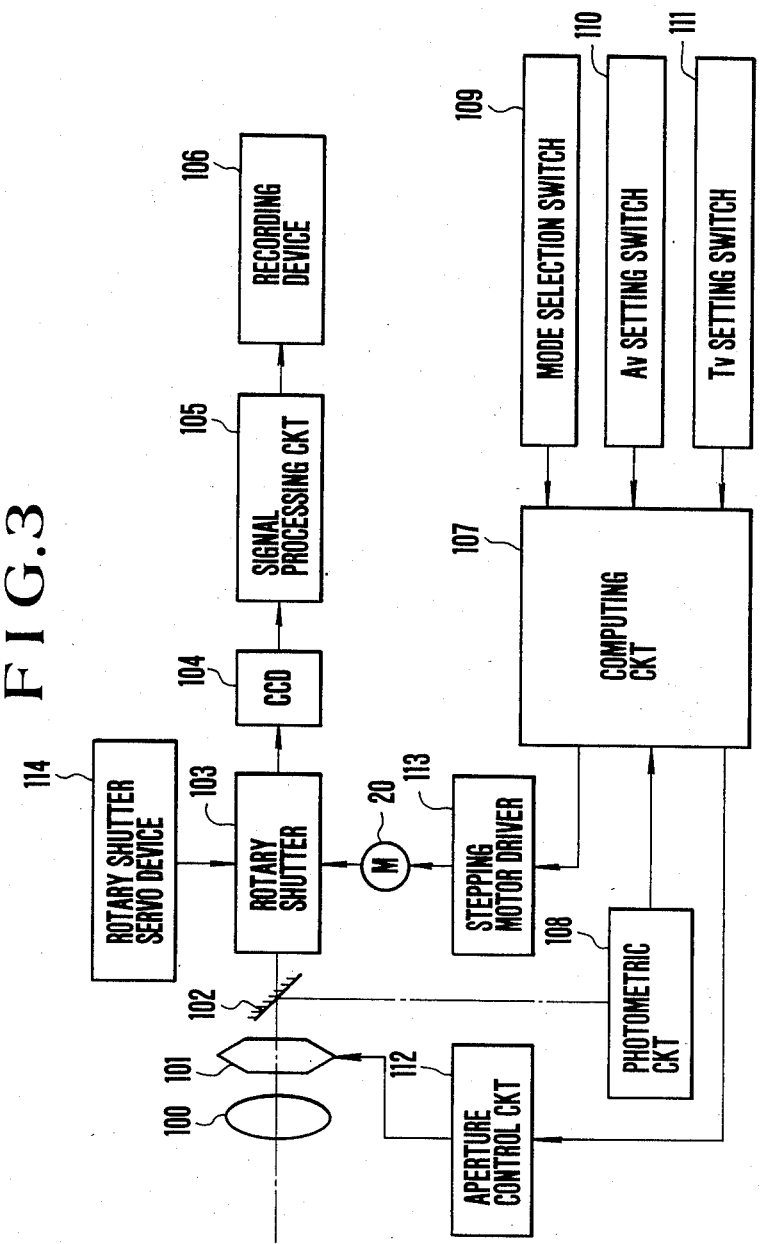
FIG. 3 is a block diagram showing the shutter time switching control system of the FIG. 1 embodiment.

An example of arrangement of the shutter time switching control system of this embodiment is shown in FIGS. 3-6. FIG. 3 shows the electric control system of a camera required for the switching operation shown in FIG. 2. The illustration of FIG. 3 includes an image sensing optical system 100; a stop 101; a beam splitter 102; and a rotary shutter 103. The beam splitter 102 is arranged to divide a light flux coming from an object to be photographed into two and to allow the divided light fluxes to pass to an image sensor 104 and a photometric circuit 108. The image sensor 104 is, for example, a charge coupled device (CCD) or the like. A signal processing circuit 105 is arranged to process a signal produced from the image sensor 104. A recording device 106 is shown as an example of the output arrangement of the embodiment. A computing circuit 107 is arranged to control the operation of the whole camera. A photometric circuit 108 may be arranged in the same manner as the known photometric circuit used for an ordinary single-lens reflex camera of the silver halide type. The illustration further includes a mode selection switch 109; an aperture value (Av) setting switch 110; and a shutter time value (Tv) setting switch 111. The photometric circuit 108 drives an aperture control circuit 112 and a suitable drive device on the basis of information obtained from the switches 109, 110 and 111. For example, the circuit 108 controls the stop 101 through a stepping motor 20 and also controls the opening angle of a rotary shutter 103 through a stepping motor driver 113 and the stepping motor 20. Further, a servo device 114 is arranged to control the rotation speed and rotation phase of the rotary shutter 103 through the DC motor 1 which is shown in FIG. 1. These devices and circuits are arranged and function in a known manner and therefore do not require detailed description of them herein. Operation of the control system of FIG. 3 is arranged as described above will now be described. First, the stop 101 is fully opened. A light flux from the object to be photographed is thus allowed to come to the photometric circuit 108 via the image sensing optical system 100, the stop 101 and the beam splitter 102. The output of the photometric circuit 108 is supplied to the computing circuit 107. The brightness (Ev) of the object is determined. Then, the shutter time (or the value Tv) or the aperture (or the value Av) is determined according to the setting position of the mode selection switch 109 on the basis of the value Ev. In the case of a shutter time priority mode, for example, the aperture value Av is determined according to the shutter time value Tv set at the shutter time setting switch 111 and the above-stated value Ev as expressed below:

$$Av = Ev - Tv$$

In the case of an aperture priority mode, the shutter time value TV is determined according to the aperture value set at the aperture value setting switch 110 and the value Ev as expressed below:

$$Tv = Ev - Av$$

In either of the two modes, the desired aperture and shutter time can be determined in this manner. Then, on the basis of these values, the aperture of the stop 101 and the opening angle of the rotary shutter 103, or shutter time, are controlled via the aperture control circuit 112 and the stepping motor driver 113, so that the quantity of light incident upon the image sensor 104 can be adjusted to a quantity suited for photographing. The image sensor 104 photo-electric converts a signal of an object image formed on its image sensing face. The output of the image sensor 104 is converted into a normal video signal by the signal processing circuit 105. The recording device or recorder 106 records this video signal on a record bearing medium such as a magnetic tape or magnetic disc or the like.

Figure 4:
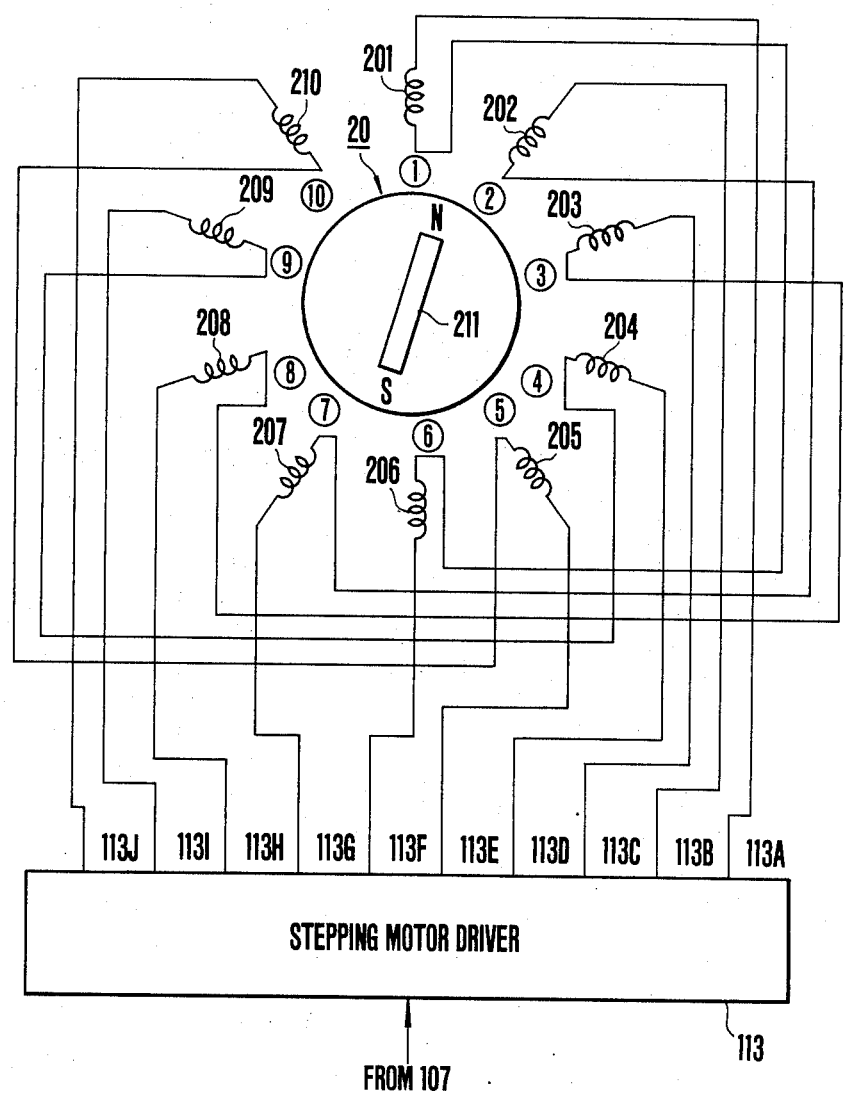
FIG. 4 is a connection diagram of the stepping motor driving circuit shown in FIG. 3.

FIG. 4 shows a driving circuit for the stepping motor 20 which is shown in FIG. 3 and arranged to control the opening angle of the rotary shutter 103. The illustration of FIG. 4 includes the windings 201 through 210 of the stepping motor 20. The winding 201 has its one end connected to the output terminal 113A of the stepping motor driver 113 and the other end to the one end of the winding 206. The winding 206 has the other end thereof connected to the output terminal 113F of the driver 113. A current flowing through these windings 201 and 206 forms magnetic poles ① and ⑥. The magnetic pole ⑥ is excited to become an N pole and the magnetic pole ① to become an S pole when a current flows to the output terminal 113A from the output terminal 113F through the windings 206 and 201. Likewise, when a current flows from the output terminal 113G of the driver 113 via the windings 207 and 202 to the output terminal 113B of the driver, a magnetic pole ⑦ is excited to become an N pole and a magnetic pole ② to become an S pole. Other windings 203, 204 and 205, windings 208, 209 and 210, other output terminals 113C, 113D and 113E and output terminals 113H, 113I and 113J of the stepping motor driver 113 are also connected in the same manner to form poles and poles ③, ④ and ⑤ and poles ⑧, ⑨ and ⑩ as shown in FIG. 4.

The stepping motor 20 is provided with a rotor 211, which consists of a permanent magnet. For the sake of simplification of illustration, the rotor 211 is assumed to be of bipolar arrangement and to be magnetized as shown in FIG. 4.

Figure 5A:
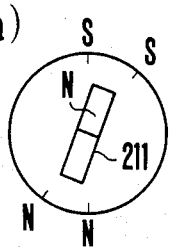
Figure 5F:
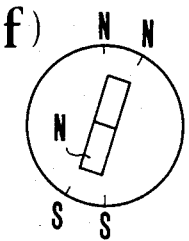
Figure 5B:
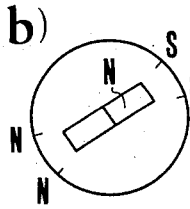
Figure 5G:
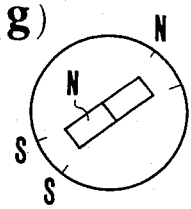
Figure 5C:
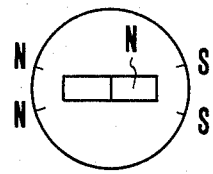
Figure 5D:
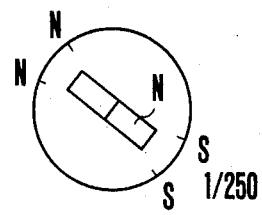
Figure 5H:
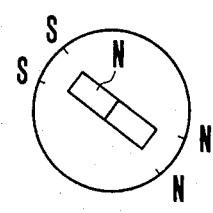
Figure 5E:
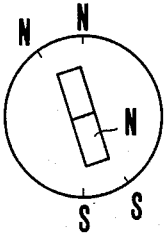
Figure 5J:
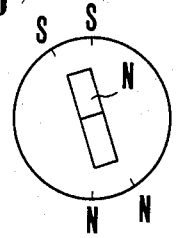

Referring to FIGS. 5(a)–5(j), operation of the stepping motor shown in FIG. 4 will now be described. The stepping motor 20 is assumed to be two-phase driven. When the output terminals 113A, 113B, 113F and 113G are controlled to be respectively at L, L, H and H levels (hereinafter a low level will be referred to as L and a high level as H for short) and the magnetic poles ① and ② are caused to become S poles and the magnetic poles ⑥ and ⑦ to become N poles, the rotor 211 takes a phase as shown in FIGS. 4 and 5(a). Let us assume that the state as represented by FIG. 5(a) corresponds to a shutter time value of 1/1000 sec. When the magnetic poles ② and ③ are likewise controlled to become S poles and the magnetic poles ⑦ and ⑧ and to become N poles, the rotor 211 advances by one step in the above-stated first direction (or a clockwise direction) to take a phase as shown in FIG. 5(b). This state corresponds to a shutter time value of 1/500 sec. In the same manner, FIG. 5(d) shows a state corresponding to 1/250 sec and FIG. 5(h) a state corresponding to 1/125 sec. In switching the shutter time from 1/500 sec to 1/250 sec as indicated by an arrow d1 of FIG. 2, the stepping motor 20 is driven to move by two steps from the state of FIG. 5(b) to that of FIG. 5(d) in the first direction. In switching the shutter time from 1/125 sec to 1/250 sec as indicated by an arrow d2 in FIG. 2, the stepping motor 20 is driven to move five steps in the second direction from the state of FIG. 5(h) to that of FIG. 5(c) and, following that, is driven to move one step backward in the first direction. Further, FIG. 5(j) shows a step position to which the stepping motor 20 is to be driven to move an extra one step in the second direction in the case of switching the shutter time from a low speed shutter time to a high speed shutter time of 1/1000 sec as mentioned in the foregoing. In that instance, the stepping motor 20 is driven to move backward by one step from this state to the state of FIG. 5(a).

FIGS. 4 and 5(a)–5(j) are simplified illustrations. In an actual application of the invention, if the shutter time is arranged to be shiftable between 1/1000 sec and 1/125 sec by rotating the stepping motor 20 a plurality of times, the number of windings may be decreased from the number of windings shown in the drawing. It is also possible to have the stepping motor driven in a single-phase driving mode. Further, in such a case, the stepping motor 20 may be arranged to be driven in a two-phase driving mode for switching between relatively high shutter speeds, such as between 1/1000 sec and 1/500 sec, and to be driven with a single-phase power for switching between relatively low shutter speeds. This arrangement permits reduction in response time for shutter time switching with the number of steps required for the operation of the stepping motor decreased.

FIG. 6 shows in a flow chart a shutter time (Tv) setting operation. A shutter time value which is currently set is assumed to be Tv1. At a step A1, a desired Tv value is obtained by the computing circuit 107 according to the process described with reference to FIG. 3. This desired Tv value is assumed to be TV2. At a next step A2, a difference $\Delta Tv$ between the current Tv value and the desired or computed Tv value is computed: $\Delta Tv = Tv1 - Tv2$. Step A3 determines whether the two values are equal or not. If the two are equal, a further process is suspended until a next Tv value input is supplied. If the two are not equal, it is determined whether the current Tv value Tv1 is larger than the desired Tv value Tv2 at a step A4. Here, a relation Tv1>Tv2 means that the shutter time is currently set at a higher shutter speed value than the desired shutter speed value and that, in order to obtain the desired shutter time value TV2, the stepping motor 20 must be driven in the above-stated first direction. A relation Tv1>Tv2 means the converse state. In the case of Tv1>Tv2, the operation at a step A5 jumps to a routine for decreasing the Tv value. Then, assuming that one step rotation of the stepping motor 20 changes the shutter opening by one step, the stepping motor is driven to move by a number of steps $\Delta T$ in the direction in which the opening angle of the shutter 103 becomes wider. Then, at a step A6, the shutter time Tv is switched to the desired value Tv2. With the desired value attained, a further process is suspended until a next shutter time value Tv is supplied.

When Tv1<Tv2 at the step A4, the operation proceeds to a routine for increasing the value Tv (step A7). In that case, the stepping motor 20 is driven in the second direction. Then, since the difference $\Delta Tv$ is of a negative value, the value Tv is made into a value $\Delta T1$ by adding 1 to a value obtained with the sign of the value $\Delta Tv$ inverted (step A8). At a next step A9, the stepping motor 20 is driven by $\Delta T1$ steps in the second direction to increase the shutter time value Tv, i.e., in the direction in which the opening angle of the shutter 103 becomes narrower. In this case, since the stepping motor 20 is driven to move excessively by one step beyond the desired value Tv2, the motor then must be driven backward to move back by one step. Therefore, at a step A10, this difference is assumed to be $\Delta T = 1$. The stepping motor 20 is then driven to move in the direction in which the shutter time value Tv becomes smaller or in the first direction to an extent to make the shutter time value Tv smaller by one step according to the routine of step A5. With the shutter time value thus switched to the desired value Tv2, a further process is suspended until a next Tv value is supplied.

In accordance with the method for determining the shutter time value (Tv) as described above, the desired value Tv2 is always attained through the Tv decreasing routine (step A5). The stepping motor 20 is thus arranged to be driven in the first direction before completion of switchover to a desired shutter time value. An error in exposure control due to the above-stated hysteresis characteristic of the stepping motor thus can be prevented or lessened.

Figure 7:
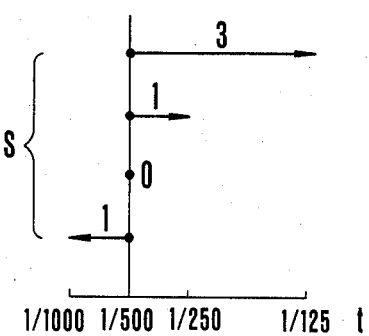
FIG. 7 is a graph showing the shutter time switching operation of a second embodiment of this invention.

FIG. 7 shows the shutter time switching operation of a second embodiment of this invention. The mode of the shutter time switching operation of the second embodiment shown in FIG. 7 will be described below in comparison with the operation mode of the first embodiment shown in FIG. 2. In the following description, the shutter time is assumed to be switched between the highest shutter speed 1/1000 sec and the lowest shutter speed 1/125 sec. In the case of FIG. 2, the stepping motor is arranged to be single-phase driven with a step position for a shutter time value 1/1000 sec set as a reference step and switching between 1/1000 sec and 1/500 sec arranged to be carried out in one step; switching between 1/500 and 1/250 sec in two steps; and switching between 1/250 and 1/125 sec in four steps respectively. The single-phase driving arrangement has an advantage in that, after a driving current is cut off, the stepping motor 20 is held in the step position by virtue of a residual torque and resumes the original position even when it receives an external vibration, so that power consumption can be reduced to a great extent. However, a disadvantage of the switching mode resides in that the response time of the shutter time switching operation becomes long as the number of steps between one shutter time value and another increases in a multiple manner. Operation of the second embodiment shown in FIG. 7 will now be described.

Since the highest shutter speed is generally not frequently used, the second highest shutter time is arranged to be the reference step of the stepping motor of the second embodiment. The stepping motor is two-phase driven for shifting the shutter time between the highest shutter speed and the second highest shutter speed. In the event of selecting the highest shutter speed, a driving current is continuously supplied to the stepping motor 20. More specifically, the stepping motor is two-phase driven in one step for shifting the shutter time between 1/500 sec and 1/1000 sec; is single-phase driven in one step for shifting between 1/500 sec and 1/250 sec; and is single-phase driven in two steps for shifting between 1/250 and 1/125 sec as shown in FIG. 7. Further, the motor is also two-phase driven for switch-over from 1/1000 sec to 1/500 sec.

The embodiment shown in FIG. 2 requires seven steps for shifting from the reference step to a step position corresponding to 1/125 sec. In the second embodiment of the invention shown in FIG. 7, this shifting can be accomplished in three steps instead of seven. The response time of the shutter time switching operation thus can be reduced to about ½.

In the second embodiment given above, the step position of the motor for the second highest shutter speed is arranged to be a reference step and the number of stepping motor driving phases is arranged to be changed to have different driving phases for steps before and after the reference step. In practicing this invention, however, the reference step may be set at any step between the highest shutter speed time and the lowest shutter speed time.

Figure 8:
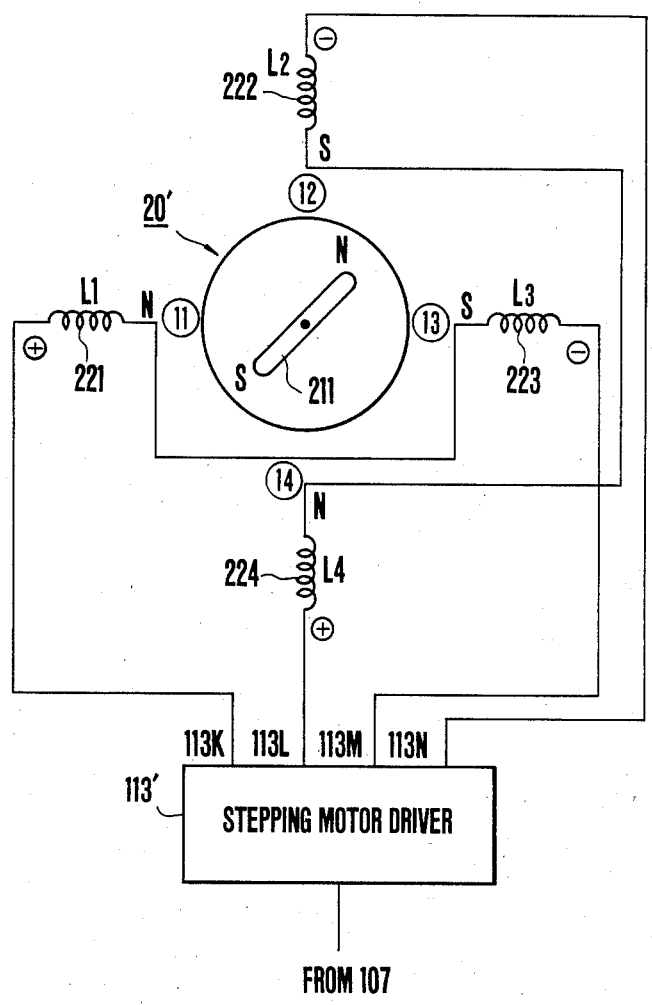
FIG. 8 is a connection diagram of the stepping motor driving circuit of the second embodiment.

FIG. 8 shows the details of the stepping motor 20' and stepping motor driver 113' which are arranged to control the opening angle of the rotary shutter 103 in the second embodiment. The stepping motor driver 113' is arranged to drive the stepping motor 20' on the basis of a signal produced from the computing circuit 107. The stepping motor 20' is provided with windings 221-224. The winding 221 has one end thereof connected to an output terminal 113K of the stepping motor driver 113' and the other end to one end of the winding 223. The other end of the winding 223 is connected to an output terminal 113M of the driver 113'. The winding 222 has one end thereof connected to an output terminal 113N of the driver 113' and the other end to one end of the winding 224. The other end of the winding 224 is connected to another output terminal 113L of the driver 113'. The currents flowing through these windings are as indicated by signs ⊕ and ⊖ and in FIG. 8. Magnetic poles ⑪ - ⑭ are formed by these currents at one ends of these windings 221-224 and become N, S, N and S poles. A rotor 211 of the motor 20' is composed of a permanent magnet and is shown, for the sake of simplification of description, in a bipolar arrangement and magnetized to have polarity as shown in FIG. 8.

The arrangement of FIG. 8 operates as shown in FIGS. 9(a)-9(e). Assuming that the shutter time is at 1/500 sec which is the reference step, when the motor is single-phase driven with the output terminals 113K, 113L, 113M and 113N of the stopping motor driver 113' respectively set at L, L, L and H levels (L: low and H: high), the phase of the rotor 211 is controlled as shown in FIG. 9(b). In this example, the phase shown in FIG. 9(b) is considered to be the initial phase of the rotor. Then, in setting the shutter time value at 1/250 sec, the motor is single-phase driven by setting the output terminals 113K-113N at L, L, H and L levels respectively. The phase of the rotor 211 is thus controlled to become that shown in FIG. 9(c). In setting the shutter time value at 1/125 sec, the high and low levels of currents produced from the output terminals 113K-113N of the motor driver 113' are shifted from one to the other to change the phase of the rotor 211 in the sequence of phases shown in FIGS. 9(c)→9(d)→9(e). The changes in the phase are as shown in the following table:

| Phase changes: | FIG. 9(a) | FIG. 9(b) | FIG. 9(c) | FIG. 9(d) | FIG. 9(e) |
|---|---|---|---|---|---|
| 113 K | H | L | L | L | H |
| 113 L | L | L | L | H | L |
| 113 M | L | L | H | L | L |
| 113 N | H | H | L | L | L |
| shutter time | 1/1000 | 1/500 | 1/250 | — | 1/125 |
| Number of driving phases | two | single | single | single | single |

In setting the shutter time at 1/1000 sec, the levels of the above-stated output terminals 113K-113N are caused to become H, L, L and H respectively and the stepping motor is two-phase driven. Then, the phase of the rotor 211 is controlled to be that shown in FIG. 9(a). The shifting extent from the reference phase of FIG. 9(b) to the phase of FIG. 9(a) is ½ of the shifting extent from the reference phase to the phase of FIG. 9(c). Accordingly, the opening angle of the shutter corresponding to the phases of FIGS. 9(a), 9(b), 9(c) and 9(e) can be set in the ratio of 1:2:4:8, so that the shutter time can be set at a desired value. Further, as has been described with reference to FIG. 7, the number of steps required for shifting to each shutter time value is as follows:

From 1/500 to 1/1000: 1 step, from FIG. 9(b) to FIG. 9(a)

From 1/500 to 1/250: 1 step, from FIG. 9(b) to FIG. 9(c)

From 1/500 to 1/125: 3 steps, from FIG. 9(b) to FIG. 9(e)

Therefore, compared with the conventional devices, the length of time required for shutter time switching can be reduced to about ½, so that the responsivity of the device can be improved to a great extent according to the arrangement of this embodiment.

Further, this arrangement may also be arranged to have the stepping motor always driven in the above-stated first direction when it is or comes to a point one step before a desired step position during a driving operation performed to bring it to the desired step position in the same manner as in the case of the first embodiment. More specifically, a third embodiment of the invention shows an example of such arrangement. The stepping motor 20' is controlled without changing the driving direction in the same manner as shown in FIG. 7 for switching the shutter time from a shorter exposure time to a longer exposure time. When switching the shutter time to a shorter exposure time, the stepping motor is driven to turn excessively by one step beyond a desired step position and then is driven to turn backward to come to the desired step position.

FIG. 10 shows the stepping motor operation of the third embodiment. In this case, in switching the shutter time, for example, from 1/125 sec to 1/1000 sec, the rotor is first caused to make one turn from the state of FIG. 9(e) as follows: FIG. 9(e)→FIG. 9(d)→FIG. 9(c)→FIG. 9(b)→FIG. 9(a)→FIG. 9(e) and, after that, is caused to turn from the state of FIG. 9(e) to that of FIG. 9(a). This arrangement of the third embodiment enables the stepping motor to bring about a desired shutter time value in a fewer number of steps than in the case of the first embodiment shown in FIG. 2.

What is claimed is:

1. An exposure control device, comprising:
   (a) exposure control means for controlling a degree of exposure;
   (b) a stepping motor arranged to drive said exposure control means; and
   (c) motor control means for causing said stepping motor to be driven in a two-phase driving mode for a first exposure time by said exposure control means and in a single-phase driving mode for a second exposure time that is longer than said first exposure time.

2. A device according to claim 1, wherein said exposure control means includes a shutter.

3. A device according to claim 2, wherein said shutter includes a rotary shutter.

4. A device according to claim 3, wherein said stepping motor controls the opening angle of said rotary shutter.

5. A device according to claim 1, wherein said stepping motor controls the length of an exposure time to be effected by said exposure control means.

6. A device according to claim 1, wherein said stepping motor includes a rotary type motor.

7. A device according to claim 1, wherein said motor control means includes means for driving said stepping motor in the two-phase driving mode when the shortest exposure is to be effected by said exposure control means.

8. A device according to claim 1, including means for arranging exposure time values of exposure to be controlled by said exposure control means in a multiple series.

9. A device according to claim 1, wherein said motor control means is capable of driving said stepping motor in a first direction or in a second direction which is reverse to said first direction; and is arranged to drive said stepping motor always in said first direction from a point at least one step before a desired step position of the motor during the motor driving operation thereof.

10. An exposure control device, comprising:
   (a) exposure control means for controlling a degree of exposure;
   (b) a stepping motor arranged to drive said exposure control means; and
   (c) motor control means capable of driving said stepping motor in a first direction or in a second direction which is reverse to said first direction, said motor control means being arranged to always drive said stepping motor in said first direction from a point at least one step before a desired step position of said stepping motor during the motor driving operation thereof.

11. A device according to claim 10, wherein said exposure control means includes a shutter.

12. A device according to claim 11, wherein said shutter includes a rotary shutter.

13. A device according to claim 12, wherein said stepping motor controls the opening angle of said rotary shutter.

14. A device according to claim 10, wherein said stepping motor controls the length of an exposure to be effected by said exposure control means.

15. A device according to claim 10, wherein said stepping motor includes a rotary type motor.

16. A device according to claim 10, wherein said motor control means includes means for driving said stepping motor in a two-phase driving mode when a first exposure time is to be effected by said exposure control means and in a single-phase driving mode when a second long exposure time that is longer than said first exposure time is to be effected by said exposure control means.

17. A device according to claim 16, wherein said motor control means includes means for driving said stepping motor in the two-phase driving mode when the shortest exposure time is to be effected by said exposure control means.

18. A device according to claim 10, including means for arranging the exposure time values of exposure to be controlled by said exposure control means in a multiple series.

19. A device according to claim 10, wherein said first direction is a direction in which said stepping motor is driven to make the length of exposure time longer.

20. An apparatus comprising:
   (a) drive means to be driven in a first direction and in a second direction different from the said first direction, said drive means having a different stopping position when driven to a desired position in the first direction than in the second direction;
   (b) control means for controlling said drive means to be driven to the desired position, said control means driving said drive means in the first direction at least one step beyond the desired position; and
   (c) exposure control means for controlling an exposure value, and wherein said drive means is arranged to change the exposure value.

21. An apparatus of claim 20, wherein said drive means includes a stepping motor.

22. An apparatus of claim 21, further comprising:
   exposure control means to controlling exposure value wherein said stepping motor changes said exposure value.

23. An apparatus of claim 22, wherein the exposure value is an exposure time.

24. An apparatus of claim 20, wherein the exposure value is an exposure time.

* * * * *